United States Patent
Miller

Patent Number: 5,815,550
Date of Patent: Sep. 29, 1998

[54] REMOTE CONFERENCE CALLING FOR WIRELINE SYSTEMS

[75] Inventor: S. Robert Miller, Mantua, N.J.

[73] Assignee: Michael J. Ceglia, Cherry Hill, N.J.

[21] Appl. No.: 717,354

[22] Filed: Sep. 20, 1996

Related U.S. Application Data

[60] Provisional application No. 60/004,146 Sep. 22, 1995.

[51] Int. Cl.⁶ .................................................. H04M 11/04
[52] U.S. Cl. .......................... 379/37; 379/40; 379/93.21; 379/202; 379/42; 340/531
[58] Field of Search .................................. 379/37, 38, 39, 379/40, 45, 49, 51, 93.21, 202, 203, 204; 340/531, 539

[56] References Cited

FOREIGN PATENT DOCUMENTS

WO94/22262  9/1994  WIPO .

*Primary Examiner*—Curtis A. Kuntz
*Assistant Examiner*—Melur Ramakrishnaiah
*Attorney, Agent, or Firm*—Norman E. Lehrer

[57] ABSTRACT

A method and means by which a called telecommunications device (14), connected on an established PSTN telecommunications link (18) with a wireline data processing means caller telecommunications device (12), can initiate a conference call to be set up from the wireline caller device (12) by sending a command signal to the data processing means caller device (12). In response to the command signal, the data processing means caller device (12) executes a signal set, predetermined to cause the PSTN (18) to set up the desired conference link (20) at the caller end of the established link (18). The method can be applied by a called alarm monitoring facility (14) to obtain emergency assistance for a distressed wireline caller (12) by causing a conference link (20) with a caller local PSAP (16) to be set up automatically from the wireline caller device (12). In so doing, the method promotes the acquisition of needed emergency assistance in the least attainable time while accessing the best source of relevant emergency information.

11 Claims, 4 Drawing Sheets

REMOTE CONFERENCE CALLING FOR WIRELINE SYSTEMS

CROSS REFERENCE TO RELATED APPLICATIONS

This application claims the benefit of U. S. Provisional Patent application Ser. Nr. 60/004,146, Filed Sep. 22, 1995.

BACKGROUND

1. Field of the Invention

This invention relates to user initiated conference calling on the public switched telecommunications network and to its application to improve the emergency aid response time and accuracy associated with alarm monitoring.

2. Description of Prior Art

Local alarm monitoring companies can pretty reliably determine the 7/10-digit (i.e., conventional 7-digit or 10-digit) emergency response telephone numbers of PSAPs within their own local alarm monitoring areas. They can incorporate those 7/10-digit telephone numbers into a local database that is cross referenced to monitored alarm sites. The stored numbers can then be used to contact the appropriate PSAP when the nature of an alarm from a monitored alarm site indicates response by public safety personnel.

PSAP is an acronym for Public Safety Answering Point. A PSAP is an agency or facility designated by a governmental authority to act as an emergency response center. Its function is to expedite: determining the nature of calls for emergency assistance; and connecting the callers with appropriate emergency services.

Unfortunately, using a 7/10-digit telephone number to contact a PSAP to request emergency aid is a badly compromised practice. Most PSAPs assign incoming calls in priority groups within an ACD (Automatic Call Distribution) telephone switch. The priority of incoming calls on 7/10-digit lines is typically, and rightfully, set below that of calls on 9-1-1 lines. As a result of their lower priority, delays can readily occur in answering 7/10-digit calls. During busy periods, such calls can even go unanswered. Even PSAPs that have no ACD switches give 9-1-1 calls manual priority over 7/10-digit calls.

In contrast, compare this badly compromised procedure with contacting a caller local PSAP through the Enhanced 9-1-1 system by dialing 9-1-1 from the caller location. In the United States and in many other countries, dialing 9-1-1 automatically and rapidly places the caller in direct contact with the geographically correct, caller local PSAP, because of an innate characteristic, called selective routing, that is designed and built into Enhanced 9-1-1 systems. Note that, in some areas of the world, numbers other than 9-1-1 are used to similarly access emergency services.

A caller local PSAP is a PSAP having a geographic jurisdiction that includes the caller's location. Typically, a caller local PSAP is the best resource for getting emergency aid to a distressed caller or endangered property. It is also the best source of relevant information for providing emergency aid to a distressed caller or endangered property within its geographic jurisdiction. That information is prepared and compiled by caller local Enhanced 9-1-1 authorities, who are focused on the caller local PSAP's geographic jurisdiction and the accuracy and completeness of information concerning it.

Selective routing is a feature that gives an Enhanced 9-1-1 system the ability to speedily and automatically route a 9-1-1 call to a PSAP based on the location of the caller. The location, typically, is inferred from telephone company records.

In rare cases, a caller local PSAP's geographic jurisdiction may also include the alarm monitoring facility's location. When this fortunate rarity occurs, the alarm monitoring facility can dial 9-1-1, thereby applying the full resources of the Enhanced 9-1-1 system to ensure contacting the jurisdictionally correct, caller local PSAP in the speediest possible way. This highly desirable circumstance completely eliminates the problems associated with trying to get emergency assistance via 7/10-digit calls to the PSAP.

Unfortunately, even a local alarm monitoring facility is rarely in the same PSAP jurisdiction as a monitored alarm system. Typically, if any alarm monitoring facility were to dial 9-1-1, it would get its own local PSAP, which would not be properly equipped to assist in the caller local PSAP's jurisdiction.

Consequently, alarm monitoring facilities are forced into the practice of using 7/10-digit telephone numbers to attempt contacting caller local PSAP's.

To make matters worse, alarm monitoring companies are regionalizing, and covering larger geographic areas in order to increase their commercial operating efficiency. Some even plan to monitor alarms anywhere in the world from a single central alarm monitoring facility.

To give meaning to this growing new service, the alarm monitoring facility must be able to reliably and expeditiously contact the correct caller local PSAP to summon appropriate assistance.

Reliably and expeditiously contacting the correct caller local PSAP is a very definite problem. Intending to combat that problem, alarm monitoring companies are attempting to create a national database of 7/10-digit PSAP telephone numbers, cross referenced to PSAP geographic jurisdictions. It is intended that this database then be used to determine the geographically correct caller local PSAP when an alarm has been received and confirmed to signify a need for emergency assistance.

Creating a complete and currently accurate national database of this scope in a useable format is a very major and very costly undertaking . . . assuming it is possible to do so at all. Aside from the issue of accuracy, it has already been shown that the very use of 7/10-digit numbers to contact PSAPs for emergency assistance is, by its nature, a badly compromised practice.

Typically, the caller telecommunications device linking a monitored alarm site to an alarm monitoring facility is a wireline digital communicator located at the monitored alarm site. Through this device, an activated, monitored alarm and its nature can be communicated to an alarm monitoring facility via the PSTN.

PSTN is an acronym, intended to describe a Public Switched Telecommunications Network, inherently capable of implementing a conference call as described herein, and including wireline and wireless telecommunications. Enhanced 9-1-1 systems, directly or indirectly, are a part of the PSTN.

Wireline is a term intended to describe fixed site telecommunications_equipment and media linked to the PSTN via one or more physical signal_conductors, comprised of such physical materials as metallic wire and fiber optics filaments. Devices popularly referred to as portable telephones, although not linked by physical signal conductors to associated fixed site equipment, are still to be considered wireline devices, since the fixed site equipment is linked to the PSTN via physical signal conductors.

Wireless is a term intended to describe telecommunications devices, equipment, and media not classified as wireline. Generally, the term is intended to describe mobile telecommunications devices, equipment, and media linked to the PSTN via signal transmissions in the electromagnetic spectrum, such as radio transmissions. Examples of such equipment include those devices popularly known as cellular telephones, personal communications devices, and mobile telephones.

Digital communicator is a term intended to describe a data processing means of a type currently known and in common use throughout the alarm monitoring industry. As applicable to this invention, a digital communicator typically comprises a PSTN compatible, microprocessor controlled, telecommunications device, located at a monitored alarm site, and connected to a conventional telephone line, generally a wireline. When triggered, typically by an external sensor, a digital communicator automatically dials one or more predetermined telephone numbers, at least one of which typically contacts a called device (i.e., a called telecommunications device) at an alarm monitoring facility. Via the PSTN telecommunications link that is consequently established, the digital communicator then sends predetermined information to the called device to describe the site location and the type of alarm. A digital communicator incorporates all of the circuitry and devices necessary to make it capable of automatically: connecting to a telephone line; generating hookflashes; dialing telephone numbers; and communicating data bidirectionally with other, compatible devices on an established telecommunications link. It may comprise a separate standalone device, but is more typically integrated into an alarm system control panel.

An example of such an alarm system control panel, incorporating integral digital communicator functions and capabilities, is the Series MA1000e Household Fire and Burglary Warning System Control Unit, manufactured by NAPCO Security Systems, Inc.

Such an alarm may be activated manually by a person at the monitored alarm site, or it may be activated automatically by a sensor or control device at the monitored alarm site.

Such an alarm transmission is always initiated from the monitored alarm site. Consequently, throughout these descriptions the monitored alarm site end of the telecommunications link may also be termed the caller or caller site, and the alarm monitoring facility may also be termed the called or called site.

Accordingly, the telecommunications device at the caller site may also be termed the caller device (i.e., the caller telecommunications device). Because of other characteristics that are explained in the following, the caller device may also be termed the data processing means caller device. Throughout these descriptions, the terms caller device, caller telecommunications device, and data processing means caller device all refer to the same device, and are used interchangeably.

Similarly, the telecommunications device at the called site may also be termed the called device.

Throughout these descriptions, a called device at an alarm monitoring facility is, by definition, compatible with any monitored alarm facility caller device that establishes a telecommunications link with it.

Typically, when a telecommunications link has been established between a caller site and a called alarm monitoring facility, the caller site location is passed via the PSTN to the alarm monitoring facility by the caller site digital communicator. Also passed is the nature of the alarm. If a need for emergency aid is confirmed by the alarm monitoring facility, the facility will then attempt to contact the caller local PSAP via a 7/10-digit telephone circuit obtained from its database.

If the alarm monitoring facility's database is not current or is otherwise inaccurate, or if the higher priority local 9-1-1 calls continually preempt the 7/10-digit call, difficulties will be encountered. At best, the alarm monitoring facility will experience delays in getting through to request emergency assistance for the distressed caller or endangered property. At worse, the facility may not be able to get through at all. When an alarm indicates a robbery in progress or a personal medical emergency, and proves to be bonafide, a few minutes or seconds often make the difference between a life saved and a life lost.

The most desirable, the most efficient, the most accurate, and the most speedy way to contact a caller local PSAP is to dial 9-1-1 from the caller location. If, from a called device, it were possible to cause a conference call to be set up at the caller end of a telecommunications link, a called alarm monitoring facility could cause a conference call to be set up at the caller site. If that conference call were set up by dialing 9-1-1 from the caller site, the alarm monitoring facility would then be able to apply the resources of the Enhanced 9-1-1 system to assure accurate caller local PSAP contact. It would also ensure doing so in the most desirable, the most efficient, the most accurate, and the most speedy way to request the needed emergency assistance.

Unfortunately, prior art does not permit setting up such a conference call. Once the PSTN has established a telecommunications link between a caller device and a called device, either device can be used to initiate a conference call, but only from the end of the link where the conference is to be set up. That is: a caller device can only be used to set up a physical conference link at the caller end of the telecommunications circuit; and a called device can only be used to set up a physical conference link at the called end. Applying prior art, neither telecommunications device can be used to initiate a conference call that is to be set up at the other telecommunication device's end of a telecommunications link.

SUMMARY OF THE INVENTION—OBJECTS AND ADVANTAGES

This invention defines Remote Conference Calling, a method and means by which the occurrence of a predetermined signal causes a conference call to be initiated by a caller device without requiring human intervention at the caller device.

In its preferred embodiment, a method and means is described by which a called device on an established telecommunications link, established by and with a PSTN capable of implementing conference calls, can be used to initiate a conference call, adding a target conference device (i.e., a target conference telecommunications device) to the established link at the caller end.

To implement Remote Conference Calling, a data processing means caller device is connected to a telephone line. As previously defined, the data processing means caller device incorporates digital communicator functions and capabilities.

Data processing means is a term intended, basically, to describe any currently known system, circuitry, device or assemblage of devices capable of inputting, processing, and outputting signals, data, or information to perform the operations and functions described herein, including all necessary conversions of such signals, data, or information into forms appropriate for processing and outputting.

The previously mentioned NAPCO MA1000e alarm control panel, incorporating digital communicator functions and capabilities, is an example of a currently available data processing means easily adaptable by its manufacturer to perform the operations and functions described herein. Operation and capabilities of the MA1000e are described by its manufacturer in a publication, entitled "MAGNUM ALERT 1000e CONTROL PANEL/COMMUNICATOR", copyright 1994 by NAPCO Security Systems, Inc., and bearing the reference number "W1582F 2/94". A person skilled in the art will readily see that the MA1000e can readily perform all of the data processor (i.e., data processing means) functions described herein with little more than a change in in its program.

In response to an event signal, a telecommunications link is established by and with the PSTN, initiated by the caller device. The telecommunications link connects the caller device with a called device. Examples of typical event signals include: manual activation of a button by a person; generation of an alarm signal by a sensor device; and activation by a timer.

A predetermined command signal is sent from the called device via the PSTN established telecommunications link, and received by the data processing means caller device.

Alternatively, the predetermined command signal can be omitted, and the data processing means programmed to proceed as though the predetermined command signal had been received by it upon establishment of the telecommunications link.

In response to the predetermined command signal, the data processing means calling device is programmed to send to the PSTN a signal set predetermined to cause the PSTN to set up a conference call at the caller end of the telecommunications link, thereby adding a conference device to the PSTN established telecommunications link.

Signal set is a term intended to describe a functionally complete series of signals required to accomplish a specific result.

Predetermined is a term intended to describe anything for which an attribute, content, or method of determining an attribute or content has been previously established, defined, or specified.

Following is an enumerated example of a typical signal set, predetermined to cause the PSTN to implement a conference call, adding a target conference device to the PSTN established telecommunications link. The signals comprising the set are presented as a set of instructions, described in terms of equivalent hookswitch operations and numerals dialed on a conventional wireline telephone instrument to set up a conference call, and approximate relative timing.

1. Generate a hookflash.

Hookflash is a standard telecommunications term for a brief, timed interruption of an established telecommunications link. A hookflash can be accomplished by a manual cycling (depress and release) of a conventional telephone instrument's hookswitch or by the electrical equivalent of that action. Typically, the duration of a hookflash interruption is about half a second. This action is predetermined to cause the PSTN to place the called device on hold, and to provide dialtone to the data processing means caller device.

2. Allow sufficient time for dialtone to be provided by the PSTN.

This can be accomplished by a inserting a simple, fixed pause into the process. It can also be accomplished by monitoring the telecommunications link for dialtone, using a call progress tone detector, such as the Teltone Corporation M-982 integrated circuit.

3. In PSTN compatible form, dial the telephone number of the target conference device.

This action is predetermined to cause the PSTN to initiate a new telecommunications link, connecting the caller device with the target conference device.

4. Allow sufficient time for the call to be answered.

This can be accomplished by inserting a simple, fixed pause into the process. It can also be accomplished by monitoring the telecommunications link for the occurrence, then absence, of ringback tones, again using the Teltone Corporation M-982 integrated circuit.

5. Generate another hookflash.

This action causes the PSTN to restore the original, called device from its holding state, and causes the PSTN to interconnect the two telecommunications links. Consequently, the caller device, the called device, and the target conference device, or any combination, are able to communicate with one another.

If the telephone number of the target conference device is 9-1-1, the appropriate caller local PSAP will automatically be contacted by direct caller device access of the resources of the Enhanced 9-1-1 system. The end result will be that the caller device, the called device, and the appropriate caller local PSAP will be able to communicate with one another, and they will be able to do so in the least time attainable.

Once a called alarm monitoring facility confirms that a caller alarm represents a bonafide emergency, Remote Conference Calling allows that facility to initiate a 9-1-1 conference call, set up from the caller device. This practice fully exploits the superb resources and capabilities inherent in Enhanced 9-1-1 systems. It accesses the accuracy, efficiency, speed, and reliability inherent in the Enhanced 9-1-1 system. It promotes getting to the best source of emergency help and relevant information in the shortest possible time. Once so conferenced, the alarm facility can communicate directly with the appropriate caller local PSAP.

In addition to the objects and advantages related throughout these descriptions, several specific objects and advantages of this invention are:

a. on a PSTN telecommunications link established between a caller device and a called device, to allow the called device to be used to initiate a conference call that is set up at the caller device, adding a target conference device to the PSTN established telecommunications link;

b. to allow a called alarm monitoring facility to initiate a conference call to 9-1-1, causing it to be set up at the caller end of a telecommunications link established between caller and called, thereby directly contacting the caller local PSAP through top priority access to the resources of the Enhanced 9-1-1 system in order to obtain emergency assistance for the distressed caller or endangered property;

c. to reduce, to the best attainable minimum, the time required for a called alarm monitoring facility to obtain emergency assistance for a distressed caller or endangered property;

d. to ensure the availability of the best and most relevant information, prepared and compiled by caller local Enhanced 9-1-1 authorities, who are focused on the caller local PSAP's geographic jurisdiction and the accuracy and completeness of information concerning it;

e. to eliminate, or substantially reduce, the badly compromised practice of using 7/10-digit numbers as the sole means of contacting a caller local PSAP to request emergency assistance for a distressed caller or endangered property;

f. to eliminate, or substantially reduce, dependence by a called alarm monitoring facility on an error prone national or regional database as the primary source of information for contacting a caller local PSAP to request emergency assistance for a distressed caller or endangered property;

g. to eliminate, or substantially reduce, the cumbersome and costly building and on-going maintenance of a regional or national database of 7/10-digit PSAP telephone numbers; and h. to allow a remote alarm monitoring facility to initiate all caller local calls required to assist the caller by using Remote Conference Calling, thereby passing the costs directly to the caller, and eliminating the considerable cumulative expense of placing long distance calls to accomplish the same ends.

BRIEF DESCRIPTION OF THE DRAWING FIGURES

The foregoing objects and many of the advantages of this invention will become more readily appreciated as they become better understood by reference to the following detailed description, taken in conjunction with the accompanying drawings, wherein:

FIG. 1A, FIG. 1B, and FIG. 1C are block diagrams, illustrating successive stages in establishing a remote conference call, via the PSTN, applying the method of this invention.

FIG. 2 is a flowchart, depicting the functional progress of a typical signal set predetermined to set up a user initiated conference call.

DETAILED DESCRIPTION OF OPERATION AND THE PREFERRED EMBODIMENT

Figure 2:
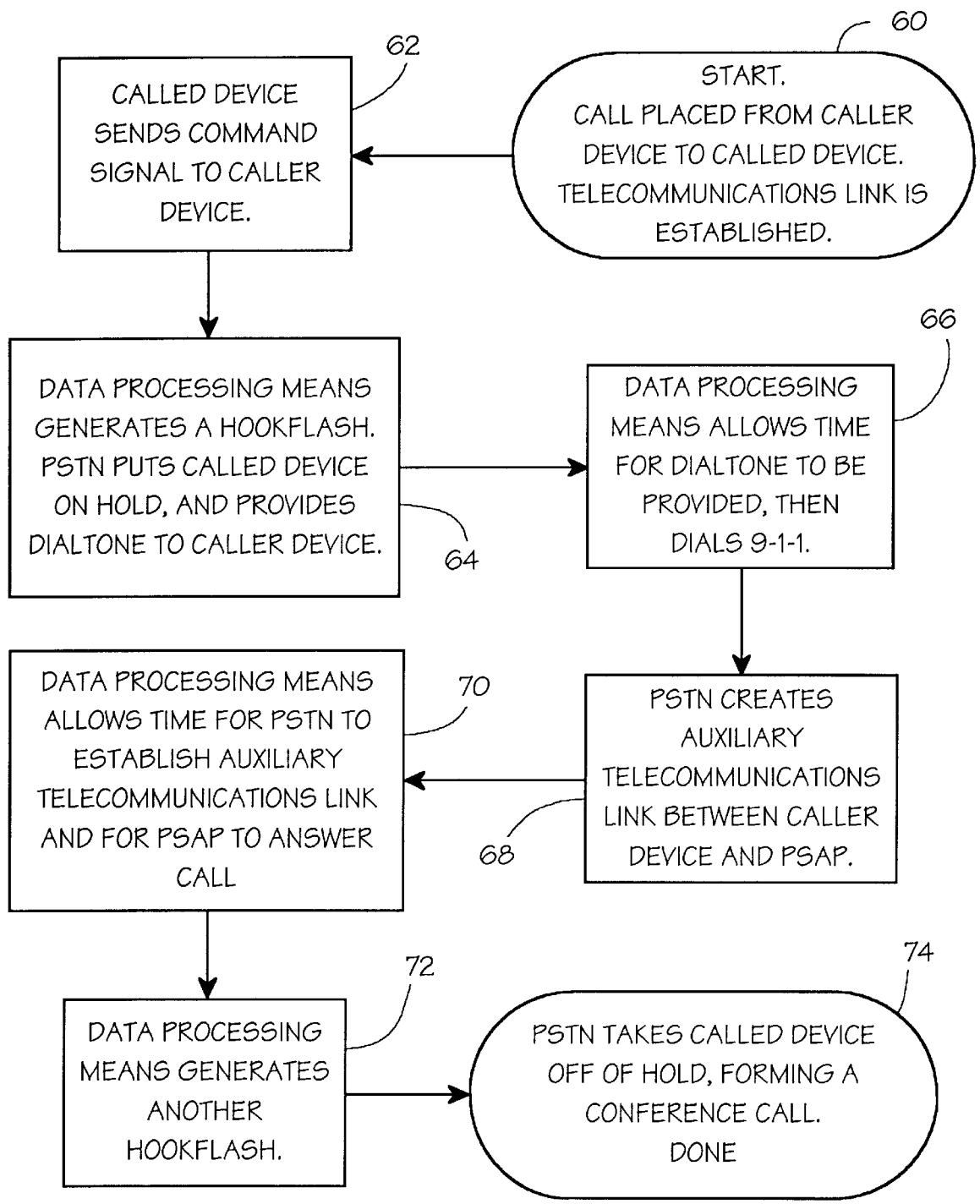

FIG. 2 Step 60 indicates that a call to called device 14 is initiated from caller device 12, establishing PSTN telecommunications link 18.

Figure 1A:
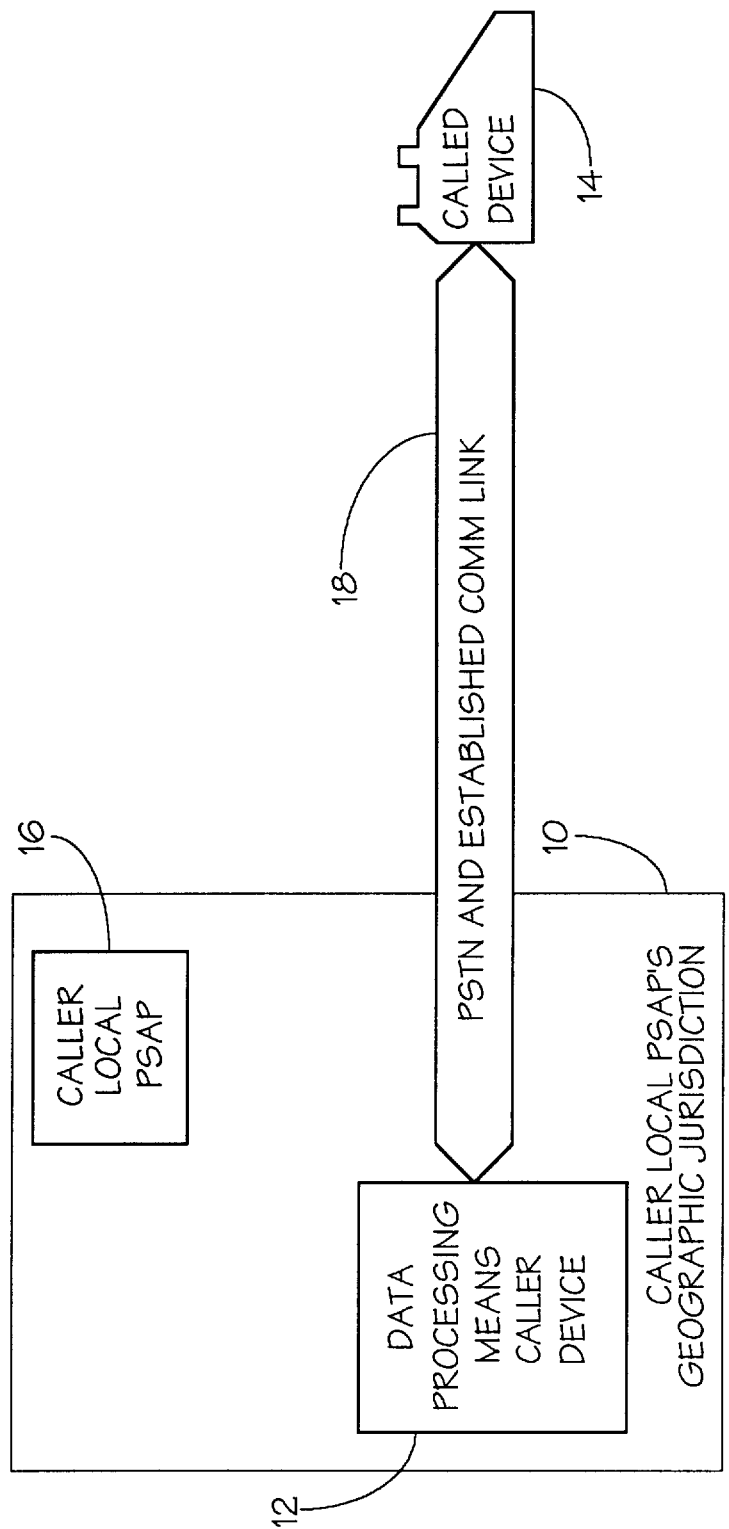

FIG. 1A illustrates the telecommunications link that is established. It is the nature of the PSTN that it is a part of any telecommunications link it creates; consequently, telecommunications link 18 is established both by and with the PSTN. As a result, it is able to receive and respond to predetermined signal sets transmitted on telecommunications link 18 by caller device 12.

Refer to FIG. 2 Step 62. A predetermined command signal is sent by called device 14, and received by caller device 12. Currently and typically, the predetermined command signal comprises: one or more predetermined DTMF or BFSK encoded tones: keyed into called device 14 by its operator; or initiated by the operator, and automatically generated and transmitted by called device 14.

Refer, now, to FIG. 2 Step 64. Data processing means caller device 12 responds to the predetermined command signal by initiating a predetermined signal set. The first part of that predetermined signal set comprises a hookflash, executed on established telecommunications link 18. The hookflash is predetermined to cause PSTN 18 to put called device 14 on hold, and to provide dialtone to caller device 12.

Next, see FIG. 2 Step 66. Data processing means caller device 12 awaits dialtone, then dials the PSTN compatible telephone number of the target device (in this preferred embodiment, the telephone number 9-1-1).

Figure 1B:
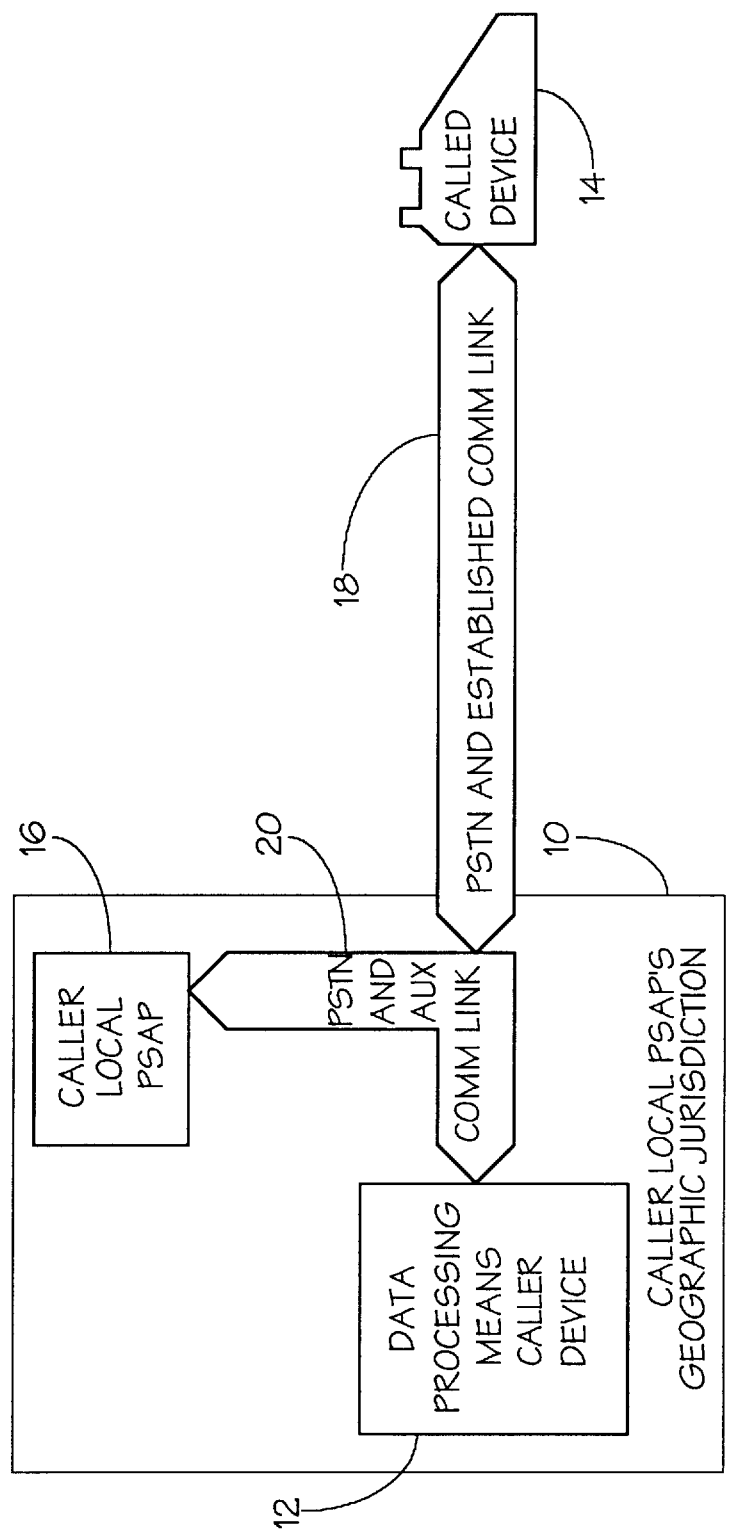

Refer to FIG. 2 Step 68. This action is predetermined to cause PSTN 18 to create PSTN auxiliary telecommunications link 20, connecting data processing means caller device 12 with the target conference device (in this preferred embodiment, caller local PSAP 16). FIG. 1B depicts the result of these actions. It shows newly created PSTN auxiliary telecommunications link 20, connecting caller device 12 with the target conference device (in this preferred embodiment, caller local PSAP 16), and symbolically depicts called device 14 holding on established telecommunications link 18.

Next, see FIG. 2 Step 70. Data processing means caller device 12 allows sufficient passage of time for PSTN 18 to establish auxiliary telecommunications link 20 and for the call placed to the target conference device (in this preferred embodiment, caller local PSAP 16) to be answered.

Refer, now, to FIG. 2 Step 72. Data processing means caller device 12 executes the last part of the predetermined signal set., generating another hookflash.

Figure 1C:
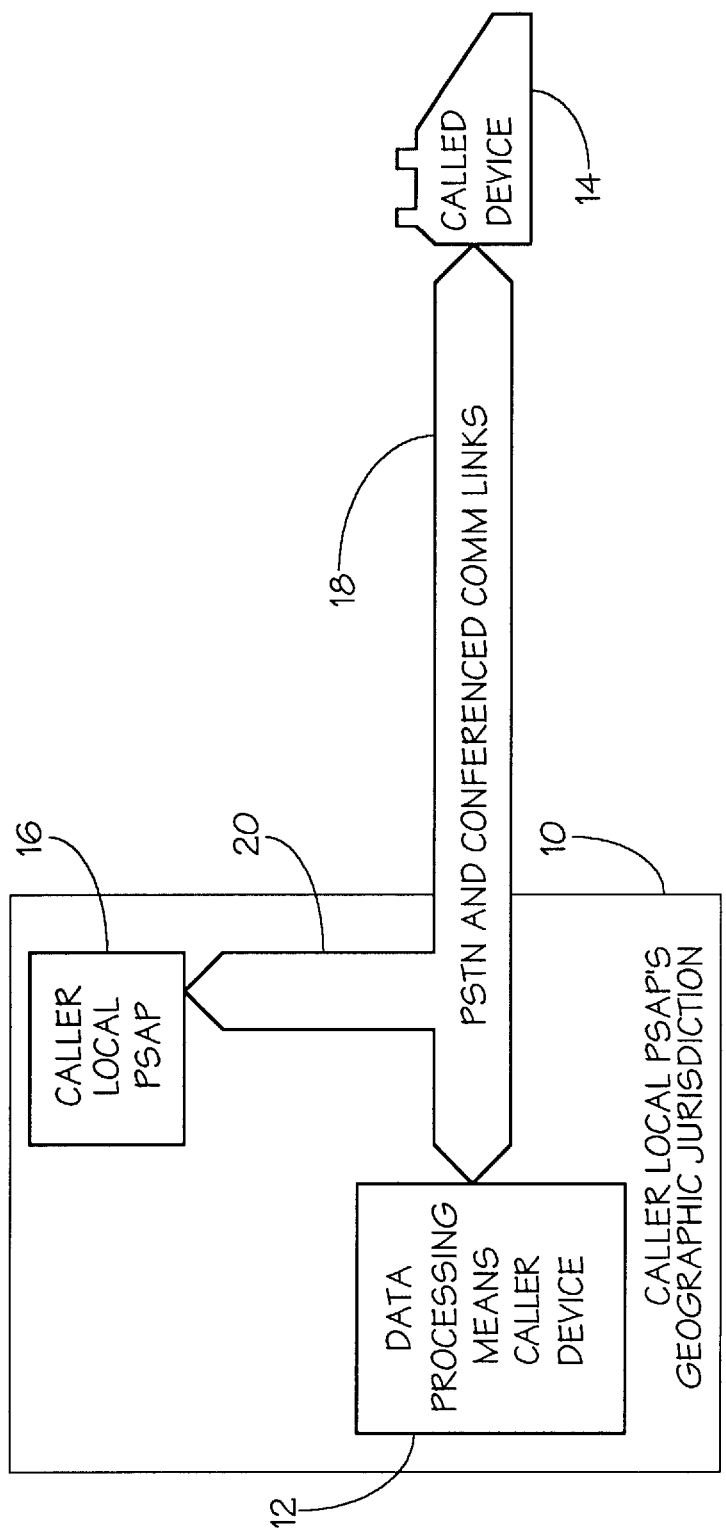

Finally, see FIG. 2 Step 74. The hookflash is predetermined to cause the PSTN to restore called device 14 from its holding state on established telecommunications link 18, forming a conference call. The PSTN does this by interconnecting established telecommunications link 18 with auxiliary telecommunications link 20, as depicted by FIG. 1C.

As a result, a conference call is formed, allowing the target conference device (in this preferred embodiment, caller local PSAP 16), caller device 12, and called device 14 (or any combination thereof) to intercommunicate.

SUMMARY, RAMIFICATIONS AND SCOPE

Accordingly, the reader will see that Remote Conference Calling can allow a predetermined signal to cause a conference call to be initiated by a caller device without requiring human intervention at the caller device.

Further, on a PSTN telecommunications link established between a caller device and a called device, Remote Conference Calling can allow the called device to be used to initiate a conference call that is set up from the caller device, adding a target conference device to the PSTN established telecommunications link.

Consequently, Remote Conference Calling can allow a called alarm monitoring facility to initiate a conference call to 9-1-1, causing it to be set up at the caller end of a telecommunications link established between caller and called, thereby directly contacting the caller local PSAP through the resources of the Enhanced 9-1-1 system to obtain emergency assistance for the distressed caller or endangered property. In so doing:

the called alarm monitoring facility can gain top priority access to the resources of the Enhanced 9-1-1 system, directly contacting the caller local PSAP;

the time required for the called alarm monitoring facility to obtain emergency assistance for the distressed caller or endangered property can be reduced to the best attainable minimum;

the best and most relevant information can be made available, prepared and compiled by caller local Enhanced 9-1-1 authorities, who are focused on the caller local PSAP's geographic jurisdiction and the accuracy and completeness of information concerning it;

the badly compromised practice of using 7/10-digit numbers as the sole means of contacting the caller local PSAP to request emergency assistance for the distressed caller or endangered property can be eliminated or substantially reduced;

dependence by the alarm monitoring facility on an error prone national or regional database as the primary source of information for contacting the caller local PSAP to request emergency assistance for the distressed caller or endangered property can be eliminated or substantially reduced;

the cumbersome and costly building and on-going maintenance of a regional or national database of 7/10-digit PSAP telephone numbers can be eliminated or substantially reduced; and allow a remote alarm monitoring facility to initiate all caller local calls required to assist the caller by using Remote Conference Calling, thereby passing the costs directly to the caller, and eliminating the considerable cumulative expense of placing long distance calls to accomplish the same ends.

Remote Conference Calling will have a positive impact on the health, safety, and well being of the general population by reducing the time between the occurrence of a public safety emergency and the arrival of on-scene help.

Essentially, only the preferred embodiment of this invention has been described. Various other embodiments and ramifications are possible within the scope of this invention. Although described herein in terms of its applicability to wireline systems, this invention can also be applied to wireless systems, as indicated in applicant's copending application, entitled "REMOTE CONFERENCE CALLING FOR WIRELESS SYSTEMS", filed concurrently herewith, and included herein by reference. Here are some examples of further embodiments and ramifications.

a. The telephone number of the target conference device need not be programmed into the data processing means. It can be included as a specifiable part of the predetermined command sent from the called device. For example:

Assume the predetermined command to contact a caller local PSAP comprises the DTMF or BFSK encoded digits 8-6-4-2. A slightly different command code, such as 8-6-4-3 can be used to indicate that additional digits follow, comprising the telephone number of the target conference device.

If that telephone number is 234-567-8901, adding the long distance prefix "1" to the telephone number, and suffixing a (16-character) DTMF or BFSK encoded "A" code as a terminator, the complete command code would be 8-6-4-3-1-2-3-4-5-6-7-8-9-0-1-A.

Upon receiving the command 8-6-4-2, the data processing means would cause a conference to be set up with the caller local PSAP.

Upon receiving the command 8-6-4-3-1-2-3-4-5-6-7-8-9-0-1-A, the data processing means would cause a conference to be set up with the telecommunications device having the telephone number 234-567-8901.

Thus, it can be seen that Remote Conference Calling can allow any telecommunications device anywhere in the world to be conferenced in applying the method of this invention.

In the above example, note that the number 9-1-1 can, itself, be dialed alternatively by sending the command 8-6-4-3-9-1-1-A.

b. Similarly, a group of predetermined telephone numbers can be stored in a repertory memory area within the data processing means, then accessed by reference code.

Assume the telecommunications device with the telephone number 987-654-3210 is to conferenced, and assume that number is stored in the data processing means' repertory memory location 31.

Expanding on the previous example, assume the code 8-6-4-4 indicates that additional digits follow, comprising a reference number to be used to access a telephone number stored in the data processing means.

Upon receiving the command 8-6-4-4-3-1-A, the data processing means would cause a conference to be set up with the telecommunications device having the telephone number 987-654-3210, having recovered that telephone number from its repertory memory location 31.

c. A command signal, sent from the called device, can be keyed into the called device by its operator. It can also be generated automatically by a data processing means interfaced with the called device (or interfaced directly into the telecommunications link), and activated upon confirming the need for emergency assistance by a distressed caller or endangered property. Similarly, a variety of predetermined command signals can be stored in such a data processing means, then selected for activation to accommodate the current need.

d. A command signal, sent from the called device, need not be comprised of DTMF or BFSK encoding. Any appropriate PSTN compatible signal technology may be employed.

e. As previously mentioned, in some areas of the world, numbers other than 9-1-1 are used to access emergency services. References herein to the number sequence, 9-1-1, apply equally in any such area, although the actual emergency access number may be different in that area.

Although the preceding descriptions contain many specificities, they should not be construed as limiting the scope of this invention but as merely providing illustrations of some of the presently preferred embodiments of this invention. Various other embodiments and ramifications are possible within its scope, as indicated by the preceding examples. Thus, the scope of the invention should be determined by the appended claims and their legal equivalents, rather than by the examples given.

I claim:

1. A method for improving the emergency aid response time to a first location having a wireline first telecommunications device which forms a part of a public switched telecommunications network comprising the steps of sensing a predetermined condition at said first location and in response to said sensed condition initiating a communications link between said first telecommunications device and a second telecommunications device at a remote second location by way of said network, establishing a communications link between said first telecommunications device and an emergency response device at a remote third location by way of said network by causing said first device to dial 9-1-1 and establishing communications between said second telecommunications device and said emergency response device.

2. The invention of claim 1 wherein said step of sensing a predetermined condition employs a sensor that is part of an alarm system.

3. The invention of claim 1 wherein said communications link between said first device and said second device is established before establishing said communications link between said first device and said emergency response device.

4. The invention of claim 3 wherein said communications link between said first device and said emergency response device is initiated from said second telecommunications device.

5. A system for improving the emergency aid response time to a first location comprising:

a wireline first telecommunications device at said first location and forming part of a public switched telecommunications network;

a second telecommunications device located at a second location remote from said first location and also forming a part of said public switched telecommunications network;

a third telecommunications device located at a third location remote from said first and second locations, said third telecommunications device also forming a part of said public switched telecommunications network;

sensor means and means responsive to said sensor means for causing said first device to establish a communications link with said second device in response to a predetermined sensed condition;

means for causing said first device to establish a communications link with said third device, and means for establishing a conference call between said first, second and third devices, wherein said third telecommunications device is an emergency response device and wherein said means for causing said first device to establish communications with said emergency response device causes said first device to dial 9-1-1.

6. The system of claim 5 wherein said means for causing said first device to establish a communications link with said third device is responsive to a signal received from said second device.

7. The system of claim 5 further including an alarm means, said sensor means forming part of said alarm means.

8. A system for improving the emergency aid response time to a first location comprising:

a wireline first telecommunications device at said first location and forming part of a public switched telecommunications network;

a second telecommunications device located at a second location remote from said first location and also forming a part of said public switched telecommunications network;

a third telecommunications device located at a third location remote from said first and second locations, said third telecommunications device also forming a part of said public switched telecommunications network;

sensor means and means responsive to said sensor means for causing said first device to establish a communications link with said second device in response to a predetermined sensed condition;

means responsive to a signal received from said second device for causing said first device to establish a communications link with said third device, and means for establishing a conference call between said first, second and third devices.

9. The system of claim 8 wherein said third telecommunications device is an emergency response device.

10. The system of claim 9 wherein said means for causing said first device to establish communications with said emergency response device causes said first device to dial 9-1-1 .

11. The system of claim 8 further including an alarm means, said sensor means forming part of said alarm means.

* * * * *